(12) United States Patent
Vancorenland et al.

(10) Patent No.: US 11,347,957 B2
(45) Date of Patent: May 31, 2022

(54) METHODS FOR LOCATING RACK-BASED ASSETS

(71) Applicant: RF Code, Inc., Austin, TX (US)

(72) Inventors: Peter Vancorenland, Austin, TX (US); Ben Gawiser, Austin, TX (US); Jonathan Guy, Austin, TX (US); Peter Kazmir, Austin, TX (US); Rick Trujillo, Austin, TX (US)

(73) Assignee: RF Code, Inc., Austin, TX (US)

( * ) Notice: Subject to any disclaimer, the term of this patent is extended or adjusted under 35 U.S.C. 154(b) by 0 days.

(21) Appl. No.: 17/129,469

(22) Filed: Dec. 21, 2020

(65) Prior Publication Data

US 2021/0110128 A1   Apr. 15, 2021

Related U.S. Application Data

(63) Continuation of application No. 16/373,566, filed on Apr. 2, 2019, now Pat. No. 10,872,215.

(60) Provisional application No. 62/651,314, filed on Apr. 2, 2018.

(51) Int. Cl.
*H04L 12/66* (2006.01)
*G06K 7/14* (2006.01)

(52) U.S. Cl.
CPC ......... *G06K 7/1417* (2013.01); *G06K 7/1413* (2013.01); *H04L 12/66* (2013.01)

(58) Field of Classification Search
CPC ......... G06K 7/1417; G06K 9/00; H04L 13/08
See application file for complete search history.

(56) References Cited

U.S. PATENT DOCUMENTS

| | | | |
|---|---|---|---|
| 6,867,701 B2 | 3/2005 | Lawrence et al. | |
| 8,144,056 B2 | 3/2012 | Graczyk et al. | |
| 8,171,142 B2 * | 5/2012 | Kolin | H05K 7/20836 709/226 |
| 8,803,660 B2 * | 8/2014 | Martin | G08C 21/00 340/10.1 |
| 8,837,954 B2 | 9/2014 | Primm et al. | |
| 9,330,287 B2 | 5/2016 | Graczyk et al. | |
| 9,704,086 B2 | 7/2017 | Primm et al. | |
| 9,734,676 B2 | 8/2017 | Apcar | |
| 10,049,240 B2 | 8/2018 | Primm et al. | |
| 10,078,812 B2 * | 9/2018 | Khuti | G06Q 10/087 |
| 10,199,715 B2 | 2/2019 | Graczyk et al. | |
| 2009/0219536 A1 * | 9/2009 | Piazza | G01S 5/16 356/445 |

(Continued)

*Primary Examiner* — Qutbuddin Ghulamali

(57) ABSTRACT

A system includes an asset management system in communication with an asset disposed within a rack, an asset tracking server, a gateway, and a set of equipment racks including the rack in which the asset is disposed. Each equipment rack defines a face. The equipment rack includes an observer device and a location indicator device. The system includes a set of tags attached to assets disposed within the set of equipment racks, a tag of the set of tags attached to the asset. The asset management system is to identify a maintenance event associated with the asset and is to communicate the identity of the asset to the asset tracking server. The asset tracking server is to locate the rack location of the tag associated with the asset and is to communicate with the associated observer device, which is to direct the location indicator device to provide a light signal.

20 Claims, 5 Drawing Sheets

(56) References Cited

U.S. PATENT DOCUMENTS

2014/0035724 A1\* 2/2014 Rothschild ............. G01S 13/75
 340/8.1
2017/0213057 A1 7/2017 Primm et al.
2017/0214117 A1 7/2017 Gracyk et al.

\* cited by examiner

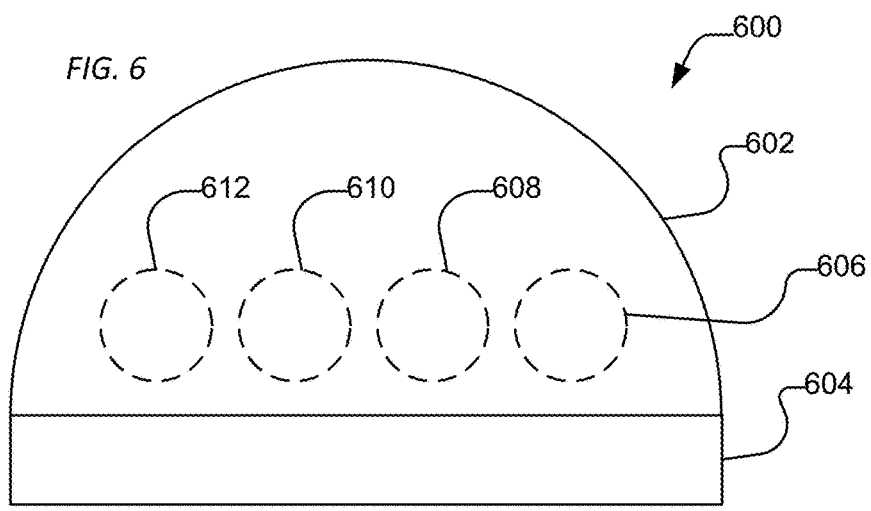
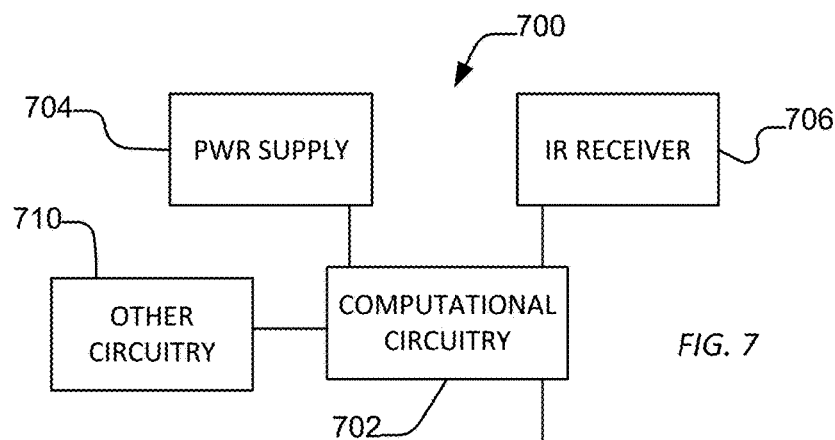
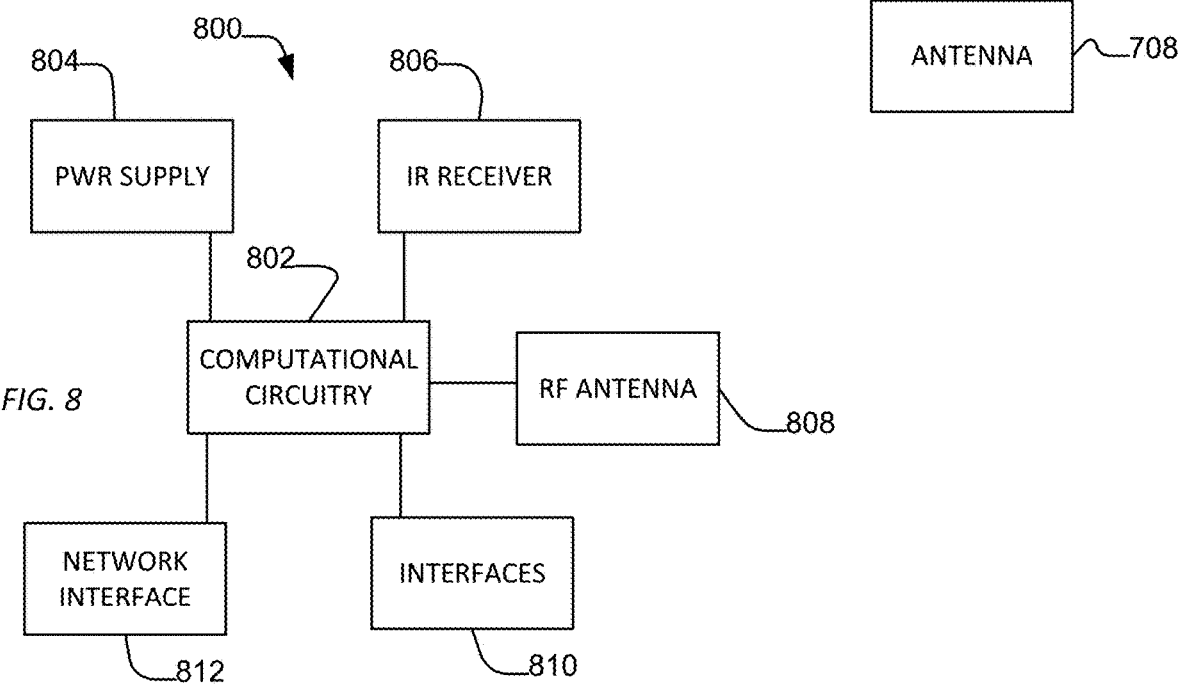

METHODS FOR LOCATING RACK-BASED ASSETS

CROSS-REFERENCE TO RELATED APPLICATION(S)

The present application is a Continuation application of U.S. patent application Ser. No. 16/373,566, entitled "SYSTEMS AND METHODS FOR LOCATING RACK-BASED ASSETS" filed on Apr. 2, 2019, which claims the benefit of U.S. Provisional Patent Application No. 62/651,314, entitled "SYSTEMS AND METHODS FOR LOCATING RACK-BASED ASSETS" filed on Apr. 2, 2018, the entirety of which applications are both herein incorporated by reference.

FIELD OF THE DISCLOSURE

This disclosure, in general, relates to systems and methods for locating rack-based equipment.

BACKGROUND

With the ever-increasing digital economy, there is increasing demand for servers and networking equipment. Typically, servers and network equipment are housed in racks. Often servers and network equipment are maintained in large facilities including a large number of racks housing similar equipment.

Periodically, servers and network equipment become damaged or need maintenance. However, the exact physical location often cannot be determined merely by its network address. Additionally, when assets are unreachable via the network due to power loss or physical failure, it is impossible to determine their location via the network. As such, in facilities housing a large number of servers and network equipment, locating a particular server or network device is difficult. In addition, tracking servers and network devices that are removed from racks for maintenance, storage, or decommissioning can be difficult. In a large facility in which service reliability is tied to the speed of equipment repair, directing personnel to the correct rack among a plethora of rows of racks becomes a challenge tied to performance and cost.

As such, improved systems and methods for directing personnel to the rack location of servers and network equipment would be desirable.

BRIEF DESCRIPTION OF THE DRAWINGS

The present disclosure may be better understood, and its numerous features and advantages made apparent to those skilled in the art by referencing the accompanying drawings.

FIG. 6 includes an illustration of an example indicator device configuration.

FIG. 7 includes an illustration of example circuitry for an asset location device.

FIG. 8 includes an illustration of example circuitry for a handheld device.

The use of the same reference symbols in different drawings indicates similar or identical items.

DETAILED DESCRIPTION

Figure 1:
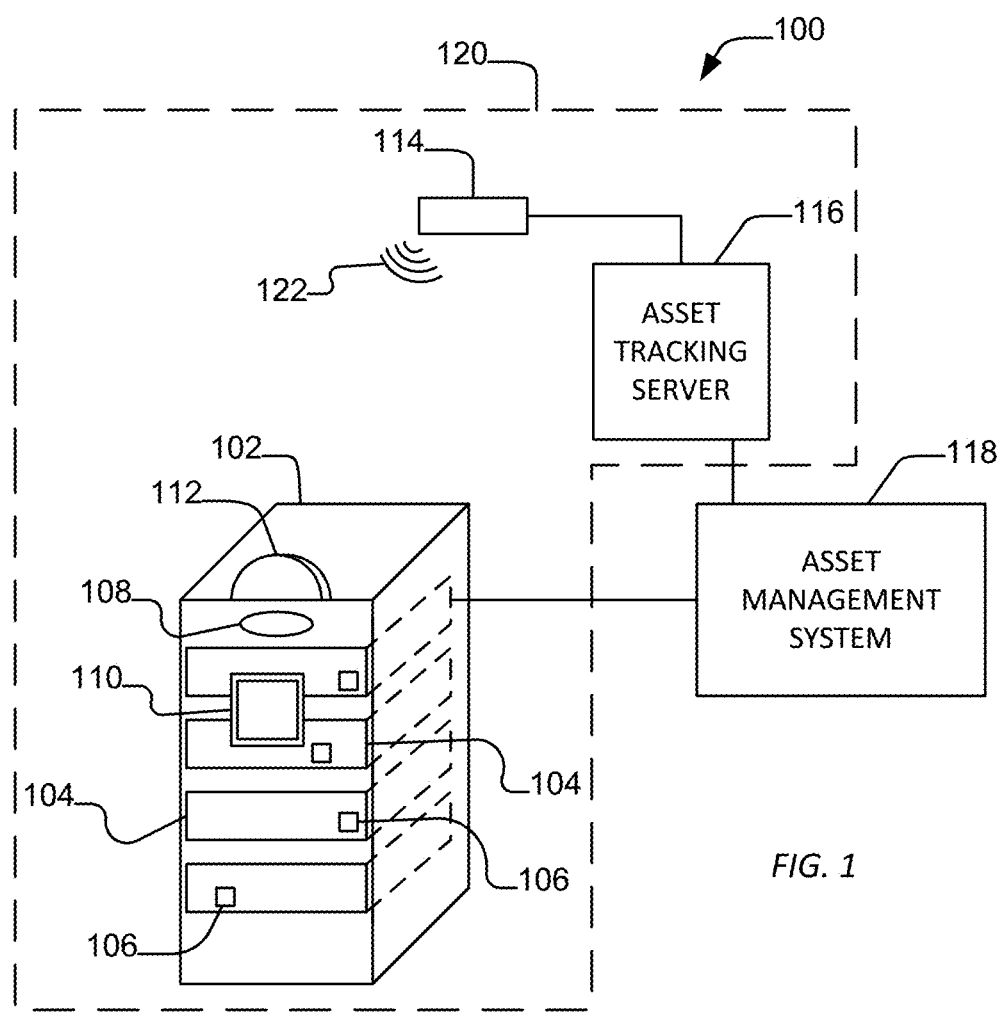
FIG. 1 and FIG. 2 include an illustration of an example asset tracking system for rack-based equipment.

In an example embodiment, the tracking system includes a gateway, a set of racks, and a set of asset location devices or tags. Each rack of the set of racks includes a rack-based observer device. The rack-based observer device can communicate characteristics of an asset location device beacon or advertising signal associated with the set of asset location devices to an asset tracking server, for example, through a wireless network to the reader in communication with the asset tracking server or through a wired network to the asset tracking server. The asset tracking server can record and maintain a database of the location of assets associated with the asset location devices. Further, a location indicator device can be associated with each rack-based observer device and can visually indicate the rack in which a select asset location device and its associated asset are located. In an example, the location indicator includes a set of light sources that can be activated in various patterns to direct technicians to a select rack. Optionally, a screen display device is associated with the rack-based observers and can provide additional information about the asset.

In an example method for tracking the rack-based assets, the rack-based observer device can receive one or more advertising or beacon signals from one or more asset location devices, each associated with a rack-based asset, and can communicate data or characteristics of the signals to the gateway. The gateway can communicate the data and signal characteristics to an asset tracking server, where determination is made regarding the rack location of a rack-based asset. The rack location can be used to determine which rack-based location indicator device to activate when indicating the location of a select asset. In addition, the locations can be used to determine a path to the rack in which a select asset is located, and the system can activate location indicator devices along the path to provide visual indications of the path to the rack and the select asset.

In another example, an equipment monitoring system can identify a maintenance event associated with a select asset and can communicate with an asset tracking system the identity of the select asset and optionally, the nature of the maintenance event. The asset tracking system can include an asset tracking server incorporating a database storing the rack location of assets. The asset tracking system can communicate to a technician the rack location of the asset, such as through a handheld device. The asset tracking system can communicate to a rack-based observer device, and the rack-based observer device can initiate a visual indicator using a location indicator device to direct the technician to the rack in which the select asset is located.

In the above examples, an asset tracking server can determine the location of the asset location device and its associated asset based on the data and characteristics of the signals received from the asset location devices or from the rack-based observer devices. In a particular example, a rack-based observer device of the one or more rack-based observer devices disposed within a rack can act as a gateway that communicates data, such as data received from asset location devices, to the asset tracking server. Optionally, the system can include an infrared beacon device. The asset location device can receive infrared signals from the infrared beacon device and can provide identifiers, data, or characteristics of the infrared beacon signal to the reader or to the rack-based observer device. Using information about location, the asset tracking server can track the location of assets and can initiate visual indication of the location of a rack-based asset using location indicator devices associated with the rack-based observer devices.

Optionally, the system can include a handheld device operable to communicate with the rack-based observer devices, the gateway, and optionally, the infrared beacon device. When the handheld device is near a rack, the handheld device can provide advertising or beacon signals to the rack-based observer devices, which can communicate the data and characteristics of the signal to the asset tracking server through the gateway or through a wired network, where the asset tracking server can determine a location of the handheld device (i.e., to which rack the handheld device is in proximity). The asset tracking server, through the gateway, can communicate the location to the handheld device or provide instructions or commands to the handheld device to provide indication that the device is proximal to a desired rack. Further, the handheld device can scan codes, such as bar codes or QR codes, associated with asset location devices or displayed on a screen device associated with a rack-based observer. When the handheld device is close to the select rack, the asset tracking system can further change the nature of a visual indicator displayed by the location indicator device to further confirm that the technician is in the correct location.

In an example embodiment, FIG. 1 illustrates a system 100 that includes an asset management system 118 and an asset tracking system 120. In an example, the asset management system 118 includes subsystems to monitor the performance of assets and determine events, such as maintenance events, associated with the assets. Assets can include, for example, servers, routers, switches, rack-based environmental equipment, storage devices, or other rack-based or free-standing equipment. Rack-based assets are assets configured to be disposed in a rack. For example, the asset management system can include a database of assets. Maintenance events can be scheduled events, for example, based on time-in-service or on a calendar. In another example, the maintenance events can be derived from performance monitoring of the assets. For example, the asset management system 118 can be in communication with an asset 104, such as through a network connection. The asset management system 118 can periodically communicate with the asset 104 to obtain performance parameters. In an example, based on the performance parameters or a failure of the asset to respond to requests, the asset management system 118 can determine a maintenance event.

When a technician is sent to address a maintenance event associated with a select asset, the asset management system 118 can communicate with the asset tracking system 120. For example, the asset management system 118 can provide an identity of the select asset to the asset tracking system 120. Optionally, the asset management system 118 can provide other information about the asset or maintenance event, such as an error code or asset configuration information, to the asset tracking system 120.

In an example, the asset tracking system 120 includes an asset tracking server 116 that includes a database associating an asset location device identifier with an asset identity and associating a rack location with the asset location device identifier or asset identity. The asset tracking system 120 further includes asset location devices 106 associated with assets 104 and rack-based observer devices 108 that work in concert with the asset location devices to identify in which rack 102 a select asset is located. Asset location devices are devices attached to or otherwise associated with assets for asset tracking, such as location tracking, and may optionally include additional sensors for further identifying location or physical parameters associated with the asset or its environment. Example physical parameters include temperature, pressure, airflow, or other physical parameters. An example asset location device can take the form of a radio frequency identification tag physically attached to an asset. A location indicator device 112 can be associated with the rack-based observer device 108. Optionally, a screen device 110 can be associated with the rack-based observer device 108. In an example, the asset tracking system 120 includes a gateway 114 in communication with the asset tracking server 116 and in communication with the rack-based observer device 108 or asset location devices 106. In an example, the gateway is a reader in wireless communication with the rack-based observer device 108 and optionally with the asset location devices 106 or an infrared beacon device. In another example, the gateway communicates with the rack-based observer device through a wired network, such as via ethernet. In a particular example, the gateway or reader 114 communicates with the rack-based observer device 108 or asset location devices 106 via a wireless signal 122.

In response to a maintenance event or other directive, the asset management system 118 can direct the asset tracking server 116 to provide the location of an asset 104 and to direct a technician to the rack 102 in which the asset 104 is located. The asset tracking system 120 can activate the location indicator device 112 to provide a visual indication of the location of the rack 102. Optionally, the asset tracking system 120 can display additional information through the screen device 110, such as scan code further confirming the identity of the asset or providing an indication of the nature of the maintenance event.

Figure 2:
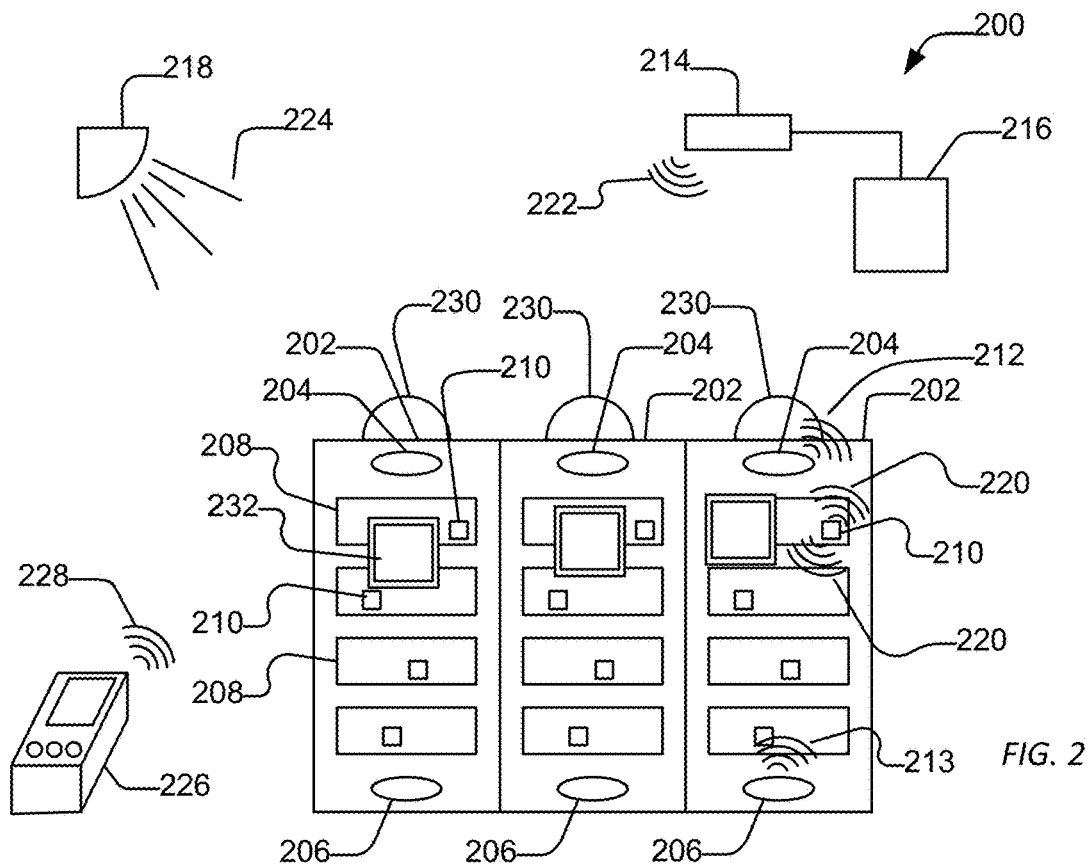

In an exemplary embodiment illustrated in FIG. 2, a system 200 includes a set of racks 202. Each rack 202 can store or warehouse assets, such as rack-based equipment 208. Each rack 202 includes one or more rack-based observer devices and associated antenna arrays (e.g., 204 or 206). Each rack 202 defines a plurality of faces. For example, the racks generally include vertically oriented faces, such as a front face, a back face, and side faces. In addition, the racks include horizontally oriented faces, such as a top face and a bottom face. The rack 202 can further be configured with positions or slots, for example, distributed vertically for servers or network equipment. Generally, the equipment 208 disposed within a rack 202 is accessible through a front face or through a back face of the rack. Often, the racks 202 are disposed side-by-side to form a row of racks. Additional rows of racks can be disposed in front of or behind the illustrated row racks, forming aisles through which the server equipment can be accessed.

Each rack 202 can include rack-based observer devices having one or more antenna arrays (e.g., 204 or 206). The one or more antenna arrays can be disposed on opposite edges of a rack and proximal to a face of the rack 202, such as a front face or a back face. As illustrated, an antenna array 204 is disposed proximal to the top edge of the rack 202, and an antenna array 206 is disposed closer to a bottom edge of the rack 202, both proximal to a front face of the rack 202.

The system 200 can further include a gateway or reader 214 connected to an asset tracking server 216. Asset location devices (illustrated as tags) 210 attached to the rack-based assets or equipment 208 can transmit advertising or beacon signals 220 that can be detected by the antenna arrays (e.g. 204 or 206) attached to a rack-based observer device. The rack-based observer devices can communicate with the gateway 214 using a signal, such as a signal 212 or 213. Alternatively, the gateway 214 and the rack-based observer device communicate over a wired network. In an example, the antenna arrays are each attached to different rack-based observer devices that each communicate with the gateway 214, either through a wireless connection or a wired connection. In another example, a single rack-based observer device can be coupled to two or more antenna arrays 204 or 206 and communicate aspects of the asset location device beacon or advertising signals received at each antenna array 204 or 206 to the gateway 214 through a wireless connection or through a wired network to an asset tracking server 216.

In an alternative example, the antenna arrays 204 or 206 can transmit advertising or beacon signals, including an identification of the antenna array. The asset location device 210 can detect the advertising or beacon signals, and the asset location device 210 can, through signal 220, communicate identifiers, data, or signal characteristics associated with the beacon signals received from the rack-based antenna arrays 204 or 206 to the gateway 214. The gateway 214 can provide the identifiers, data, or signal characteristics received from the asset location devices 210 to the asset tracking server 216, where a determination as to the rack location of the asset location device 210 and associated rack-based asset or equipment 208 can be made. In another example, the rack-based observer devices attached to the rack-based antenna arrays 204 or 206 can serve as readers or gateways, networking with the asset location devices 210, and can be in communication with the asset tracking server 216, such as a through a wired or wireless network interface, to communicate aspects of the beacon signals observed by the asset location devices 210 or other data from the asset location devices 210.

In an example in which the rack-based antenna arrays provide advertising or beacon signals, the rack-based antenna arrays 204 or 206 can communicate signals having similar frequencies and configurations. But, the signals can transmit different data or can transmit at different power levels. In particular, the signals can each include different identifiers, such as different addresses (e.g., MAC addresses), that can be used to identify in which rack and at what location within the rack the antenna array is located. For example, the asset tracking server can have a database of identifiers associated with rack locations.

When the asset location devices 210 provide a beacon signal to the rack-based antenna arrays 204 or 206, the asset location device beacon signals can include identifiers that can be used to identify the asset location device 210, and the rack-based observer can provide both the identity of the asset location device and the identity of the antenna arrays that detected the asset location device beacon signal along with characteristics of the asset location device beacon signal, such as signal strength, received at the antenna array.

The asset location devices 210 or the antenna arrays 204 or 206 can communicate, such as transmitting an advertising or beacon signal, using a frequency in a range of between 2.0 GHz and 2.5 GHz, such as between 2.25 GHz and 2.5 GHz, or between 2.4 GHz and 2.485 GHz. Further, the asset location devices 210 or the antenna arrays 204 or 206 can be configured to emit signals having a power in a range of 0.01 W to 1.1 W, such as a range of 0.05 W to 0.7 W or a range of 0.1 W to 0.5 W.

In particular, the advertising or beacon signals from the asset location devices 210, or alternatively from the antenna arrays 204 or 206, can implement a multichannel communication protocol, such as a spread spectrum communication protocol. In particular, the advertising or beacon signal can be broadcast over 2 to 5 channels, such as 3 channels. In a particular example, the communication protocol can permit bi-directional communication. In an example, the rack-based observer devices can use an antenna array to establish a wireless network, such as a master-slave wireless network. Optionally, the asset location device can participate as a slave in the master-slave wireless network. Alternatively, the asset location device can be a beacon only device.

Alternatively, the rack-based observer devices include rack-based infrared strips that extend along an edge of a face of the rack. For example, the rack-based infrared strips can extend along vertical edges of the face of the rack. The asset location devices can receive identifiers from the rack-based observer device in an infrared signal projected via the rack-based infrared strips. The asset location devices can transmit the rack identifier to the reader.

The reader 214 can communicate with the asset location device 210 or the rack-based observer device using a signal 222. For example, the gateway or reader 214 can provide commands and instructions to the asset location devices 210. In an example, the asset tracking server 216 can instruct, through the reader 214, a specific asset location device to signal its presence, such as through the use of lighting or sound. In another example, the reader 214 can communicate with a rack-based observer device. In particular, the signal 222 can have a frequency in a range of 100 MHz to 1 GHz, such as 300 MHz to 1 GHZ, or 300 MHz to 950 MHz (e.g., 900 MHz), or 350 MHz to 600 MHz, for example, 433 MHz. In an alternative example, the signal 222 can have a frequency in a range of between 2.0 GHz and 2.5 GHz, such as between 2.25 GHz and 2.5 GHz, or between 2.4 GHz and 2.485 GHz. The signals can include asset location device identifiers, commands, or data payloads, among other information. In a particular example in which the antenna arrays receive beacon signals from the asset location devices and an associated observer device communicates aspects of the beacon signals to the reader, the signals 212 or 213 can transmit messages that include an asset location device identifier, characteristics of the beacon signal, such as a signal strength, timing information, or a combination thereof and optionally, antenna or observer device identifiers. In an alternative example in which the asset location device is to detect an advertising or beacon signal from one or more antenna arrays, the asset location device can communicate with the reader with a message including an asset location device identifier, data associated with the signals received from the rack-based antenna arrays, such as signal strength, array identifiers, other beacon identifiers, timing data, or a combination thereof. In either example, the signal 222 can transmit messages that include an asset location device identifier, asset location device commands, timing information, or a combination thereof.

Optionally, the system 200 includes an area infrared beacon device 218, providing an area infrared beacon signal 224 that can be received by the asset location devices 210. The area infrared beacon signal 224 can include an identifier indicative of an area location, such as a room, that can be received by the asset location devices 210 and can be communicated by the asset location device 210 as part of the beacon signal to the observer devices, or in a signal to the gateway or reader 214. Such location information can further be stored by the asset tracking server 216 or used in determining a location of the asset location device.

In a further example, the system 200 can also include a handheld device 226. In an example, the handheld device 226 can transmit advertising or beacon signals that can be received by the antenna arrays and aspects of the handheld device beacon signal can be communicated to the gateway or reader 214 or asset tracking server 216 by the rack-based observer device. Alternatively, when the antenna arrays broadcast advertising or beacon signals, the handheld device 226 can receive beacon signals 212 or 213 from the rack-based antenna arrays 204 or 206 and can communicate identifiers, data, or characteristics of the signals 212 or 213 to the gateway or reader 214 using signal 228. The gateway or reader 214 can communicate the data and signal characteristics to the asset tracking server 216, which can determine a proximity of the handheld device 226 to a selected rack. Alternatively, the handheld device 226 can form a network with the rack-based observer device. In either case, the asset tracking server 216, through the gateway or reader 214, can communicate with the handheld device 226, providing instructions to signal when the handheld device is proximal to the desired rack 202. Optionally, the handheld device 226 further includes an infrared receiver to receive the area infrared beacon signal 224. Identifiers or data from the area infrared beacon signal 224 received at the handheld device 226 can be further communicated to the reader 214 and to the asset tracking server 216. In an example, the handheld device 226 can communicate with the gateway or reader 214 and the asset tracking server 216 to assist in finding a desired rack 202 and desired asset location device. Once the handheld device 226 is proximal to the desired rack 202, the handheld device 226 can provide a request to the asset tracking server 216 through the gateway or reader 214 to command an asset location device 210 to indicate its presence through sound or a light indicator. The signal 228 can be similar to the communication signals 222, or can include data or identifiers similar to that of the asset location devices 210 or may include additional commands, requests, or information.

In addition, the system 200 can include location indicator devices 230 disposed on the racks 202, such as near a top of the racks 202, to provide a visual signal indicating the location of a rack 202 that includes a select asset 208. In an example, the location indicator device 230 is connected to a rack-based observer device, for example, through a wired or wireless connection. The rack-based observer device can activate the location indicator device 230 in response to signals from the asset tracking server 216 directed through a network connection or wirelessly through the gateway or reader 214. Alternatively, the location indicator device 230 can operate independently from the rack-based observer device and respond to signals from the asset tracking server 216, for example, sent via the gateway or reader 214. In such an alternative example, the location of the location indicator device 230 can be determined manually during system installation. Alternatively, the location of the location indicator device 230 can be derived through wireless communication with the rack-based observer device.

In an example, the location indicator device 230 can indicate location using a visual signal. For example, the visual indicator can be a constant light signal of a select color from a set of light sources. In another example, the light signal can be a flashing of the set of light sources using a select color. Optionally, the flashing can be configured in various patterns, timing, and colors. In a further example, the location indicator device 230 can display an alphanumeric character, such as a number of a rack. In an additional example, the location indicator device 230 can flash in a coded pattern, such as Morse code. In a further example, the system 200 can identify both the rack and row in which an asset is located and can provide both a visual signal at the end of a row and at the rack in which the select asset is located. In an additional example, the system can identify a path to the rack in which the select asset is located and can activate location indicator devices along the path to guide a technician. For example, location indicator devices along the path can provide a visual signal simulating motion, for example, by consecutively or sequentially illuminating light sources in a set to simulate the movement of light in the direction along the path toward the rack with the select asset. Further, different color configurations can be used to differentiate racks and paths, particularly in the case of multiple maintenance events associated with different assets.

In another example, the system 200 can include a screen device 232 in communication with the rack-based observer device 204. In an example, the screen device 232 can display information associated with the rack or the asset to be maintained. For example, the screen device 232 can display a scan code, such as a barcode or QR code, that can be read by the handheld device 226. The scan code can reference information about the asset to be maintained, the maintenance event, or the rack. In a further example, scanning the scan code can provide confirmation that the technician is at the correct rack location or can act to initiate data collection about the maintenance, such as time to completion, actions taken, or corresponding server downtime. In another example, the screen device 232 can display messages to the technician, can identify the rack number, or can display colors further indicating to a technician that they found the correct rack. In an additional example, the screen device 232 can be a touch screen device.

Figure 3:
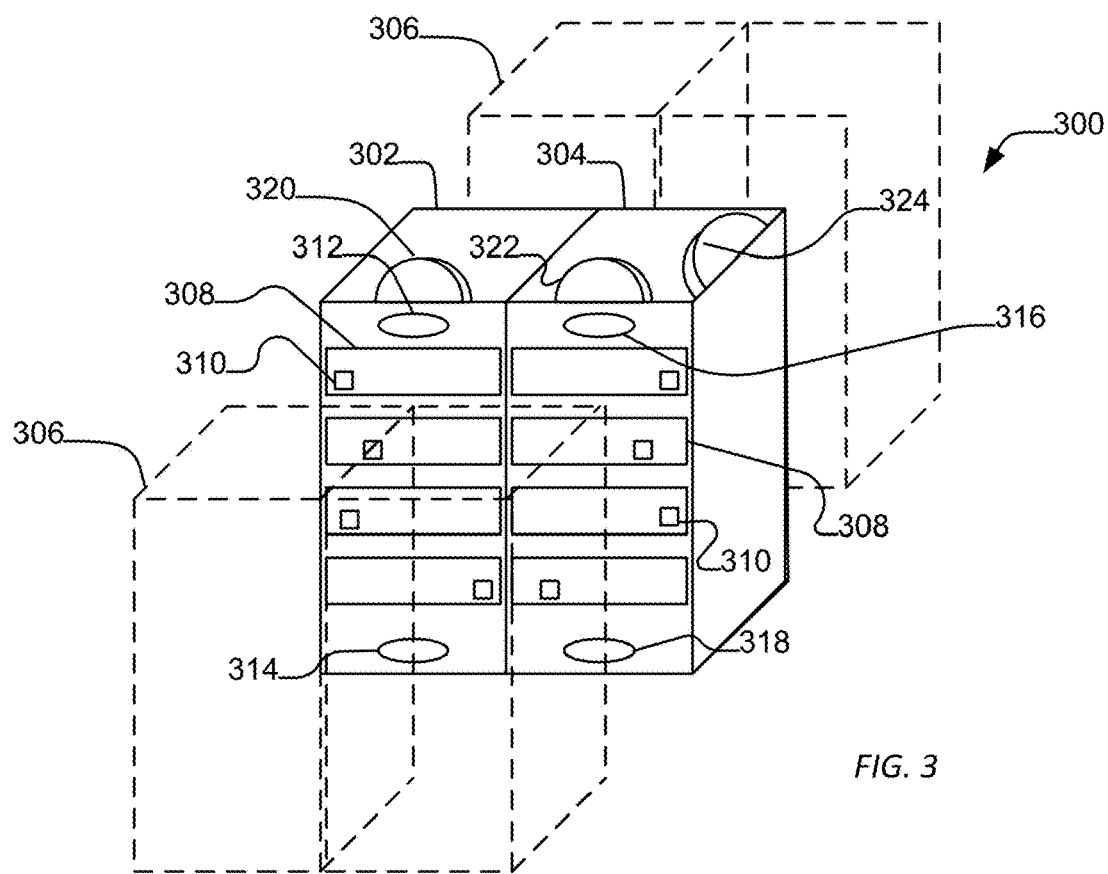
FIG. 3 includes an illustration of an example set of racks.

As illustrated in FIG. 3, a set of racks 300 can be distributed to form rows. For example, racks 302 or 304 can be positioned adjacent to each other within a row. Additional racks can be positioned in rows spaced apart from the racks 302 or 304 to form an aisle. For example, racks 306 can be disposed in a row spaced apart from the racks 302 or 304, forming an aisle between the racks 306 and the racks 302 or 304. In a particular example, a front face of the racks 302 and 304 can face a front face of the racks across an aisle. Such an arrangement allows access to the front faces of the racks, but also leads to difficulties in using conventional rack-based beacon systems because signals can bleed across aisles or between adjacent racks.

As illustrated, the rack-based equipment 308 is disposed within the racks 302 or 304. Asset location devices 310 are associated with each rack-based asset 308. One or more observer devices can be disposed within a rack and proximal to a face of the rack. For example, an antenna array 312 is disposed near a top edge and proximal to the front face of the rack 302, and the antenna array 314 is disposed near the bottom edge and proximal to the front face of the rack 302, and are each coupled to an observer device associated with the rack 302. Similarly, an antenna array 316 can be disposed proximal to the top edge and proximal to a front face of the rack 304, and an antenna array 318 can be disposed along a bottom edge of the front face of the rack 304, and are each coupled to an observer device associated with the rack 304. In a particular example, the antenna arrays (312, 314, 316, or 318) receive signals from a particular direction along the face, limiting the strength of the signal received from outside of the plane extending along the front face of the rack. As such, an asset location device or a tag 310 disposed on equipment 308 disposed in the rack 302 likely communicates a stronger signal to the antenna arrays 312 or 314 than to adjacent racks, for example, including antenna arrays 316 or 318, or racks across an aisle. Utilizing algorithms, heuristics, or statistical methods, a location of the equipment 308 attached to the asset location device 310 can be determined with a relative degree of certainty. In alternative embodiments, such antenna arrays can be configured to transmit signals along the face of the rack, with limited signal strength further from the face of the rack. While the antenna arrays illustrated in FIG. 3 are illustrated as being disposed along the top edge and the bottom edge proximal to the front face of the rack, such antenna arrays can alternatively be disposed at other locations or proximal to other faces of the rack.

Each of the racks can include a location indicator device. For example, the rack 302 has a location indicator device 320, and the rack 304 has a location indicator device 322. Further, a location indicator device 324 can be associated with a row. In an example, the location indicator device 324 can be connected to a rack-based observer device associated with the rack 304 or can be associated with a separate device in communication with the asset tracking system. In a particular example, when a technician is directed to an asset in the rack 302, the location indicator device 320 can indicate that the asset is located in the rack 302. Further, the location indicator device 324 can indicate that the asset is located within the row including the rack 302. Optionally, the location indicator device 322 can further be activated to provide a signal simulating motion toward the rack 302 and the location indicator device 320. While not illustrated, further row location indicator devices can be initiated to direct a technician toward the row including the rack 302.

Figure 4:
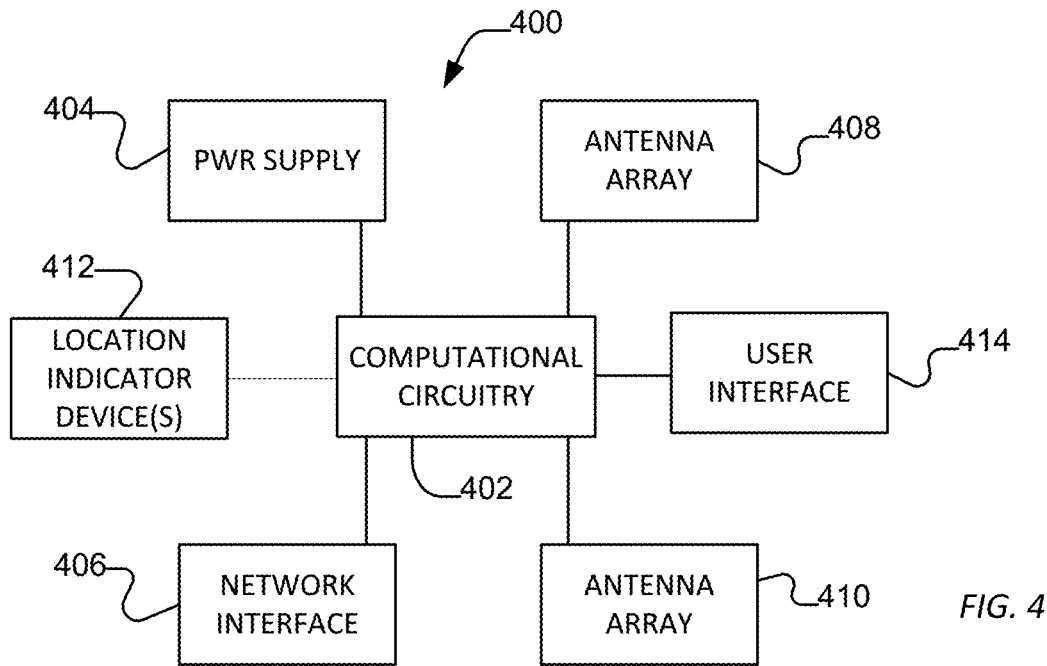
FIG. 4 includes an illustration of example circuitry associated with a rack-based observer device.

FIG. 4 includes an illustration of an exemplary circuitry 400 of a rack-based observer device. For example, the rack-based observer device circuitry 400 can include computational circuitry 402, which can include a processor and memory for implementing program instructions. The computational circuitry 402 can be coupled to a power supply 404, such as a battery, line power supply, or power over ethernet (POE). In addition, the computational circuitry 402 can be coupled to one or more antenna arrays, such as antenna arrays 408 and 410. In an example, the computational circuitry 402 can receive advertising or beacon signals from the antenna array 408. In an example, the antenna array 408 can be disposed along a top edge of the front surface of a rack. Optionally, the computational circuitry 402 can be in communication with a second antenna array 410, receiving advertising or beacon signals. In an example, the second antenna array 410 can be disposed along a bottom edge of the front face of a rack. Alternatively or in addition, the rack-based observer can include one or more arrays of infrared beacons, for example, distributed in a strip along an edge of the rack.

Optionally, the computational circuitry 402 is connected to a network interface 406 to interact with a network. For example, the network interface can be a wireless interface, a wired interface, or a combination thereof. The computational circuitry 402 through the network interface 406 can communicate with the gateway or reader or the asset tracking server of the tracking system. In particular, the network interface 406 can be used to interact with an asset tracking server of the tracking system. In an example, the network interface 406 can be an Ethernet interface, universal serial bus (USB), 802.11x compliant wireless interface, a proprietary wireless interface, such as a wireless interface to communicate with a gateway or reader, or a combination thereof. The computational circuitry can transmit identifiers and signal characteristics associated with received advertising or beacon signals, in addition to the identity of the antenna array or rack-based observer device to the asset tracking server for use in determining the location of equipment assets or handheld devices. Alternatively, an observer device can include a single antenna array for indicating location and more than one rack-based observer devices can be used in any given rack.

In an alternative example, the computational circuitry 402 can direct the antenna array 408 to provide a signal carrying an identifier indicative of location, for example, identifying a rack in which the antenna array 408 or observer device is located. The identifier can be specific to the rack or can be a unique identifier that can be associated to a rack by an asset tracking server. In a particular example, the computational circuitry 402 directs the antenna array 408 to provide an advertising or beacon signal carrying data or identifiers useful in identifying the location of the antenna array 408. Optionally, the computational circuitry 402 can direct an antenna array 410 to provide a separate signal, such as an advertisement signal or a beacon signal further identifying the second antenna array 410. Such advertising or beacon signals transmitted by the antenna arrays 408 or 410 can be detected by asset location devices that transmit identifiers and signal characteristics to gateways or readers.

Each of the antenna arrays can include one or more antennas. In particular, the antenna array can include between 2 and 10 antennas, such as between 2 and 6 antennas. In an example, the antenna array includes an even number of antennas, such as 2 or 4 antennas. In another example, the antenna array includes an odd number of antennas, such as 3 or 5 antennas. Alternatively, a single antenna can be using in place of the antenna array. For example, the single antenna can be a directional antenna.

In addition, the computation circuitry 402 can be connected to one or more location indicator devices 412. The computational circuitry 402 can be connected using a wired connection. Alternatively, the computational circuitry 402 can connect to a wireless circuitry to communicate with the location indicator device 412. In particular, the computational circuitry 402 can direct the location indicator device 412 to produce a light signal in response to receiving a communication from a central sever via a reader or over a wired network.

Optionally, the computational circuitry 402 can be connected to a user interface device 414, such as a screen device. For example, the computational circuitry 402 can direct the user interface device 414 to display messages or scan codes to a technician. The screen device can be an LCD device or an LED device, such as an OLED device. In an example, the screen device can be a touchscreen device.

The antenna arrays 408 or 410 can be configured to receive or emit signals, depending on the configuration of the system, at a frequency in a range between 2.0 MHz and 2.5 MHz, such as between 2.25 MHz and 2.5 MHz, or between 2.4 MHz and 2.485 MHz. Further, the antennas can be configured to receive or emit signals having a power in a range of 0.01 W to 1.1 W, such as a range of 0.05 W to 0.7 W or a range of 0.1 W to 0.5 W. In a particular example, the signals can be spread spectrum signals and can permit bi-directional communication. In an example, the rack-based observer devices can use an antenna array to receive beacon signals from asset location devices or can be used to establish a wireless network, such as a master-slave wireless network. Optionally, the asset location device can participate as a slave in the master-slave wireless network.

Figure 5:
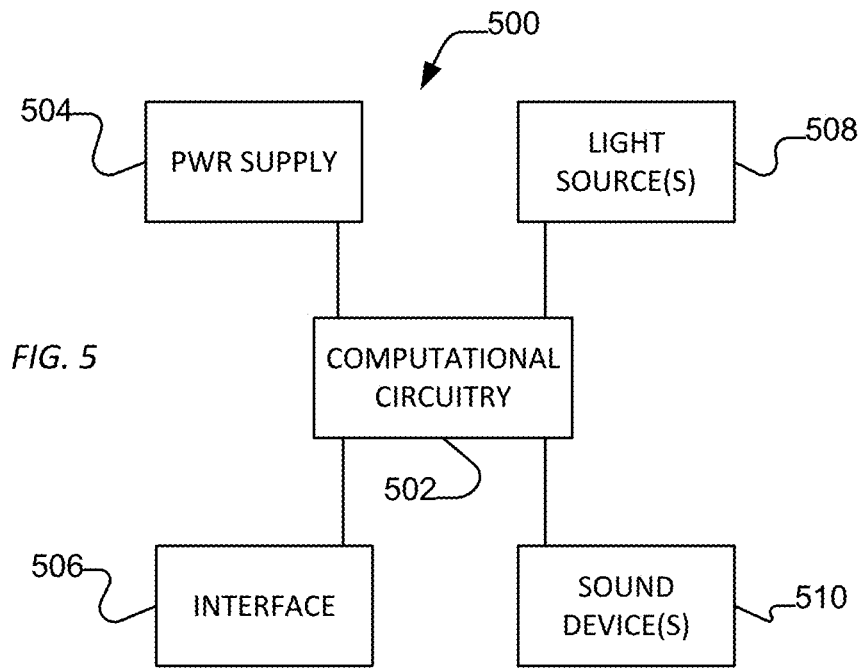
FIG. 5 includes an illustration of an example indicator device.

FIG. 5 includes an illustration of an example circuit 500 of a location indicator device. The circuit 500 includes a computational circuitry 502, which can include a processor and memory for implementing program instructions. The computational circuitry 502 can be coupled to a power supply 504, such as battery power storage, line power, power over ethernet (POE), power via USB, or power supplied from the rack-based observer device. In addition, the computational circuitry 502 can be coupled to light sources 508. In a further example, the computational circuitry 502 is connected to an interface 506. For example, the interface 506 can communicate with a rack-based observer device, for example, via a wired connection, such as a serial interface (e.g., USB), a parallel interface, or another interface. Alternatively, the interface 506 can be a wireless interface to communicate with the rack-based observer device or a reader associated with the asset tracking system. Optionally, the computational circuitry 502 can be connected to another interface device, such as a sound device 510 to provide sound signals, for example, in concert with light signals emanating from the light sources 508.

In an example, the computational circuitry 502 in response to instructions from the rack-based observer device or the reader, can direct the light sources 508 to provide a light signal indicating the rack location of a select asset. For example, when a select asset is located in the rack associated with the location indicator device, the location indicator device can turn on the light sources, flash the light sources in a pattern, or change the color of the light sources. In another example, when the rack associated with the location indicator device is at an end of a row in which the rack having the select asset is located, the location indicator device can provide a light signal to indicate that the desired rack is within the indicated row. For example, the location indicator device can turn on the light sources, flash the light sources in a pattern, or change the color of the light sources. In an additional example, when the rack associated with the location indicator device is along a path to the rack including the select asset, the location indicator device can provide a light signal to direct personnel toward the rack including the select asset. For example, the location indicator device can consecutively or sequentially activate light sources to simulate motion in the direction of the rack including the select asset. In another example, the location indicator device can display an alphanumeric character. In a further example, the location indicator device can flash in a coded pattern.

FIG. 6 illustrates an example configuration 600 of a location indicator device, which includes a housing 602 attached to a base 604. The base 604 is configured to attach to a rack, such as an upper surface of a rack or to the top of the front face of a rack. The housing 602 can include a set of light sources (e.g., light sources 606, 608, 610, or 612). The light sources can be incandescent, fluorescent, or light emitting diode (LED) light sources. In an example, the light sources are LED devices. While four light sources are illustrated, the location indicator device can include less or more than four light sources. In an example, the location indicator device includes a sufficient number of light sources to represent alphanumeric characters. In addition, other circuitry can be included in the base 604 or the housing 602.

In an example, the light sources 606, 608, 610 or 612 can be activated together to provide a constant signal or can flash together in a timed pattern of flashes. In another example, the light sources 606, 608, 610 or 612 can be activated in an order, such as sequentially along the arrangement of light sources 606, 608, 610 or 612. Such a sequential activation can provide the appearance of movement of the light. Further, the configuration 600 can include light sources 606, 608, 610 or 612 that emit different colors. The light sources can be activated to display a color or to display a pattern of colors, for example, indicative of a state of the system or a proximity of a technician. Alternatively, the system can include a set of light sources configured to illustrate alphanumeric characters.

An asset location device or tag is attached to the rack-based equipment and can include antennas to transmit beacon signals and can optionally include other radio frequency (RF) antennas to communicate with the gateway or reader. For example, as illustrated in FIG. 7, a circuitry 700 of an asset location device can include computational circuitry 702, which can include processors and memory to store and implement program instructions. In additional, the computational circuitry 702 can be coupled to a power supply 704, such as a battery or line power supply, to supply power to the computational circuitry 702 and other circuitry. In addition, the computational circuitry 702 can be coupled to one or more antennas 708. For example, the computational circuitry 702 can direct an antenna 708 to broadcast an advertising or beacon signal. Alternatively, the computational circuitry 702 can receive advertising or beacon signals from the rack-based antenna arrays through the antenna 708. Further, the computational circuitry 702 can direct the antenna 708 to communicate with a reader. In a particular example, the antenna 708 can be a multi-frequency antenna or a collection of different antennas. The antenna 708 can be a directional antenna or alternatively can include an array of antennas.

Optionally, the computational circuitry 700 can include an infrared receiver 706 in communication with the computational circuitry 702. For example, the infrared receiver 706 can receive infrared signals from an infrared beacon device that includes an identifier indicative of location. The infrared signal can be sent by a rack-based infrared array or by an area beacon device. The infrared circuitry 706 can receive the infrared signal carrying the identifier, and the computational circuitry 702 can communicate the identifier through the antenna 708 to the reader or incorporate data in a beacon-like signal.

In a further example, the computational circuitry 702 can be attached to other circuitry 710, such as lights, speakers, or vibration mechanisms. Such circuitry can be activated in response to commands from a handheld device or asset tracking server to indicate its presence.

Optionally, the system can include a handheld device to guide a user to the desired rack and provide instruction to a particular asset location device or tag. For example, as illustrated in FIG. 8, a circuitry of a handheld device can include computational circuitry 802, which can include processors and memory to store and implement program instructions. The computational circuitry 802 can be coupled to the power supply 804, such as a battery or line power supply, to provide power to the computational circuitry 802 and other circuitry. In an example, the computational circuitry 802 can be coupled to an antenna 808 to broadcast beacon signals to the rack-based antenna arrays. In an alternative example, the computational circuitry 802 can receive identifiers or signal characteristics from the rack-based antenna arrays and can communicate such identifier or signal characteristics to the reader using the antenna 808. The reader can communicate with an asset tracking server, which determines a location of the handheld circuitry and provides an indication through the reader to the handheld device to signal when the handheld device is located proximal to the desired rack. The antenna 808 can be a multi-frequency antenna or a collection of antennas for different frequencies.

The computational circuitry 802 can further be coupled to an infrared receiver 806. In an example, the infrared receiver 806 can receive an infrared signal from an area location or a rack-based infrared beacon that includes an identifier that can be used to determine location. The computational circuitry 802 can provide the identifier to the reader through the antenna 808.

The handheld device 800 can further include user interfaces 810. Exemplary user interfaces can include displays, such as touchscreen displays, buttons, switches, pointer devices, lights, vibration mechanisms, or sound devices. The computational circuitry 802 can interact with the user interface 810 to provide user interface functionality to the handheld device 800. In addition, the computational circuitry 802 can be coupled to a data interface 812, such as a USB interface or network interface. Such an interface 812 can allow for data transfer or programming or configuring the handheld device 800.

Rack-based components of the asset management system can be installed using a method including attaching at least two antenna arrays and a location indicator device to a rack. For example, the antenna arrays can be disposed opposite each other proximal to a face of the rack. In an example, two antenna arrays can be disposed; one at the top edge and one at the bottom edge of the rack proximal to the front face of the rack. In particular, the antenna arrays are configured to receive a signal, such as an advertising or beacon signal, predominantly from within a plane of the face of the rack. One or more rack-based observer devices can be coupled to the antennas to process signals received from the antennas. Alternatively, the antenna arrays are configured to provide a directed signal predominantly within a plane of the face of the rack. In another alternative or in addition, infrared arrays can be disposed along edges of a face of the rack.

A location indicator device can be installed to be within a view of a technician within an aisle or at an end of a row. In an example, the location indicator device can be installed on top of a rack near a front or back edge of the rack or near a top edge internal to a rack. Optionally, a screen device can be installed along the front or back face of the rack in view of a technician within an aisle.

Equipment can be installed in the rack. For example, the rack can include a plurality of positions or slots at which equipment, such as servers and network devices, can be disposed. Asset location devices can be attached to the equipment. In particular, the asset location devices can be placed on front surface or extend out from a surface of the equipment proximal to a front or back face of the rack. The asset location devices can be installed on the equipment prior to the equipment being installed in the rack or following installation of the equipment in the rack.

The asset location devices can transmit a signal, such as an advertising or beacon signal, to the at least two antenna arrays. The signals can include identifiers, and rack-based observers connected to the antennas can determine characteristics of the signal, such as signal strength. Alternatively, the asset location devices can receive a signal from the at least two antenna arrays. The signals can include identifiers and the asset location devices can determine characteristics of the signal, such as signal strength. The signal can have a frequency in a range of between 2.0 GHz and 2.5 GHz, such as between 2.25 GHz and 2.5 GHz, or between 2.4 GHz and 2.485 GHz.

The rack-based observers can communicate identifiers and the characteristics of the associated signals to a gateway or reader, for example using wireless signal. Alternatively, the asset location devices can communicate identifiers and the characteristics of the associated signals to a gateway or reader, for example using wireless signal. In a particular example, the gateway or reader communicates with asset location devices in frequencies in a range of 400 MHz to 500 MHz, such as a range of 400 MHz to 450 MHz or ranges of 425 MHz to 440 MHz, in particular 433 MHz. In an alternative example, the signal can have a frequency in a range of between 2.0 GHz and 2.5 GHz, such as between 2.25 GHz and 2.5 GHz, or between 2.4 GHz and 2.485 GHz. Alternatively, the observer device can be coupled through a wired network to the reader or an asset tracking server.

Alternatively, a rack-based observer device can implement a master-slave network with asset location devices through one of the at least two antenna arrays. For example, the observer device can implement a low-energy Bluetooth signal and act as a master to the asset location devices to receive a communication from the asset location devices of the identifiers and the characteristics of the signals. In such a case, the rack-based observer device can act as the gateway or reader.

The asset location device can optionally receive an infrared signal that also includes an identifier, which can be used to further determine location. For example, the asset location device can communicate the identifier within the infrared signal to a gateway or reader or a rack-based observer device acting as the gateway or reader. In an example, the identifier associated with the infrared signal can be incorporated into the beacon signal. In another example, the observer device through an antenna can establish a bi-directional network connection, such as a frequency hopping spread spectrum network connection.

The gateway or reader can communicate the data received from the observer device to the asset tracking server. For example, the gateway or reader can communicate identifiers and associated signal characteristics to the asset tracking server and optionally identifiers received from infrared beacons to the asset tracking server. The asset tracking server can determine in which rack the equipment is located based on the identifiers and associated signal characteristics. For example, the system can utilize various algorithms, heuristics, or statistical methods to determine approximately in which rack the asset location device is located. For example, the system can determine maximum signal strength of signals with associated identifiers where the identifiers are associated with racks to determine in which rack the asset location device is located. In another example, the system can utilize a linear combination of signal characteristics received from each rack and compare that linear combination to linear combinations of signal characteristics received from other racks to determine in which rack the device is located. For example, the signal strength at the top edge and bottom edge antenna arrays can be combined using a linear function, such as averaging, and compared to linear combinations of signal strengths received from other racks. In a further example, the signal strengths of the received signals can be indexed based on a minimum signal received from an array, a maximum signal received from an array, or a combination thereof. The indexed signal strengths can be used in an algorithm, heuristic, or statistical method to determine location. In another example, the asset tracking server can utilize statistics incorporating characteristics of the identified signals over time to determine in which rack the asset location device is most likely located.

Figure 9:
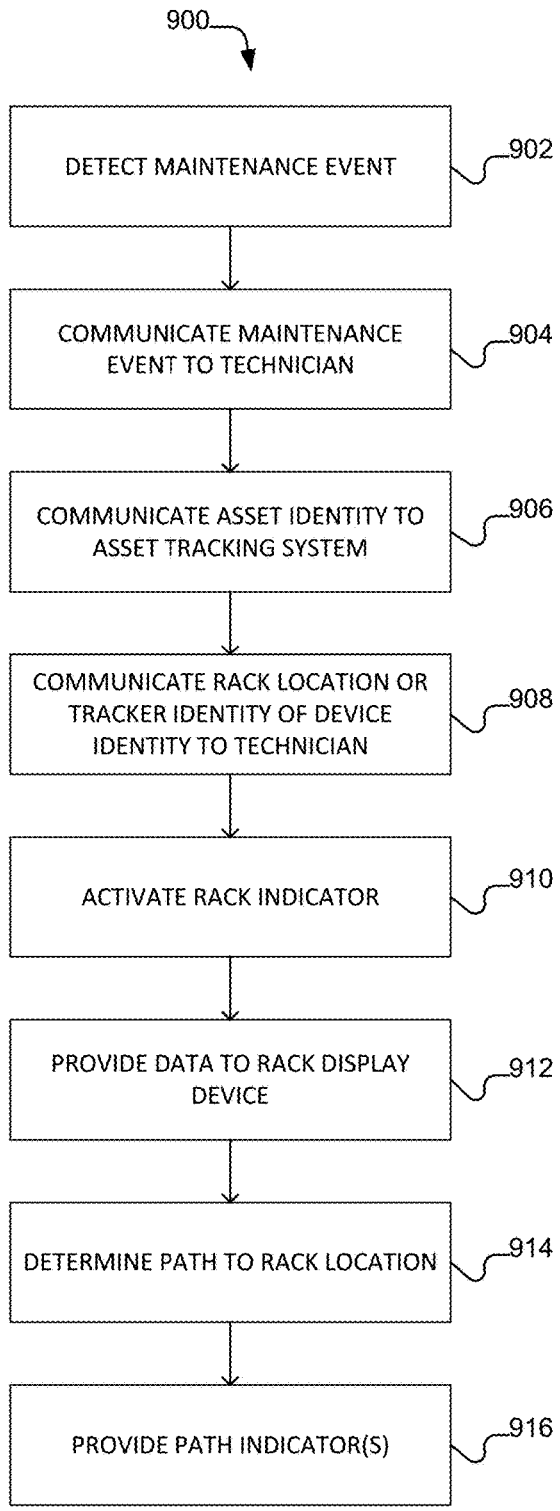
FIG. 9 and FIG. 10 illustrate example methods for locating rack-based assets.

As assets/equipment and associated asset location devices are identified and located within the tracking system, the tracking system can communicate with an asset management system to coordinate locating assets, for example, in response to a maintenance event. For example, FIG. 9 illustrates a method 900 that includes detecting a maintenance event, as illustrated at 902. In particular, an asset management system can detect a maintenance event. For example, the maintenance event can be a calendar event in which assets or equipment are maintained periodically, for example, based on an in-service date. In another example, an asset management system can monitor performance of network assets, such as servers, routers, or other network equipment and can detect, based on performance factors, suboptimal performance or failures within the asset or equipment. As such, the asset management system can identify equipment or an asset to maintain.

As illustrated at 904, the maintenance event can be communicated to a technician. For example, the asset management system can communicate to a technician the maintenance event, including for example, the identity of the equipment, the nature of the maintenance event, or other information associated with the equipment or maintenance event. Such communication can be by email, SMS, push notifications, or other messaging protocols, for example, to a computer or handheld device.

In addition, the identity of an asset or equipment associated with the maintenance event can be communicated to an asset tracking system, as illustrated at 906. For example, the asset management system can communicate across a network to an asset tracking system. The communication from the asset management system can include an identity of the asset to be located. Optionally, the communication can include information about the maintenance event or information to be communicated to a technician along with the location of the asset.

As illustrated at 908, the asset tracking system can communicate the rack location or tracker identity of the identified asset to the technician. Such a communication can be sent to a technician at a laptop or desktop location or to a handheld device, for example, via email, SMS, push notifications, or other messaging protocols.

In addition, the asset tracking system can activate a rack location indicator device, as illustrated at 910. In an example, the asset tracking system can identify the rack location of the select asset to be tracked, can identify a rack-based observer device associated with the rack in which the select asset is disposed, and can further direct the rack-based observer device to activate an associated location indicator device, to, for example, display a light signal indicative of the asset's rack. For example, the location indicator device can be directed to display a light signal of a particular color and with a particular pattern or solid light to indicate that an asset is located within the rack associated with the location indicator device.

Optionally, data can be provided to a rack display device, as illustrated at 912. For example, the identity of the select asset can be provided to a rack-based observer device attached to a screen display, and the identity of the select asset can be displayed on the screen display. In another example, the screen display can provide a scan code that a technician can scan with a handheld device. The scan code can link to additional data about the maintenance event, the select device, or routines that track the progress of a technician.

In a further example, the asset tracking system can identify a path to a rack in which the select asset is located, as illustrated at 914. In an example, identifying the path includes identifying a row in which the asset's rack is located. In such an example, a row location indicator device can be activated to guide the technician first to the desired row and then, to the select rack within the row. In a further example, the asset tracking system can identify racks between a row end and the rack in which the asset is located. In such an example, the asset management system can direct rack-based observer devices along the row from the end to the desired rack to activate location indicator devices. For example, the location indicator devices can be activated to simulate motion in the direction of the rack in which the select asset is located. In a further example, the asset management system can identify rows between the row in which the select asset is located and a fixed location such as a maintenance area and can activate location indicators to provide a simulated motion signal directing a technician towards the row in which the select asset is located. When using asset location devices, mobile devices, or other handheld devices to track a technician, the asset tracking system can determine a path from the technician at the technician's location to the rack in which the select asset is located. Once the path is determined, the indicator device along the path can be activated, as illustrated at 916.

Figure 10:
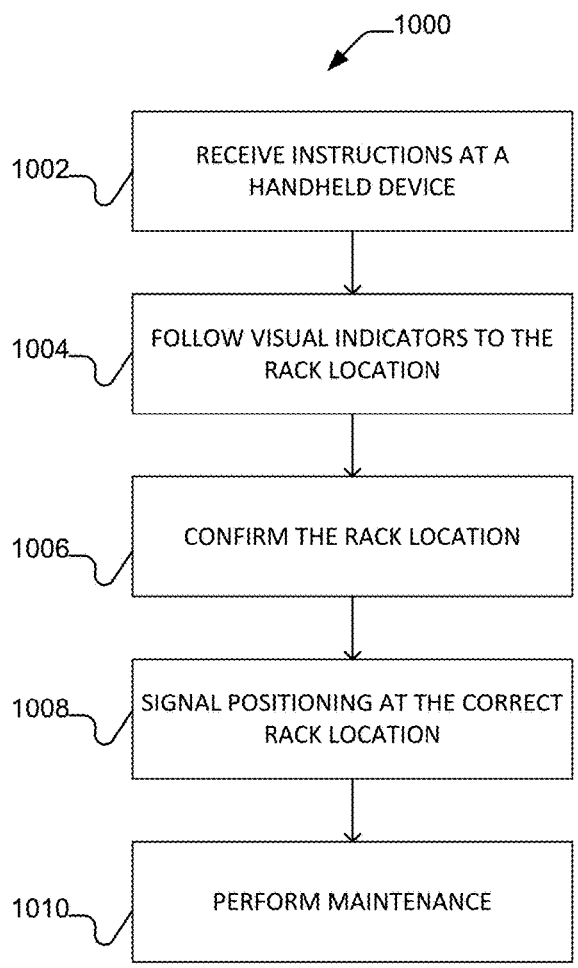

In an example in which the technician has a handheld device in communication with the asset tracking system and optionally in communication with the asset management system, the technician can both be guided by the handheld device and by visual indicators to find the correct rack location and confirm that the select asset is within the rack to which the technician is directed. For example, FIG. 10 illustrates a method 1000 in which instructions are received at a handheld device, as illustrated at 1002. Instructions can include a rack location of the asset and can include additional information about the asset or the maintenance event. For example, the instructions can include additional information about the nature of the asset, the identity of the asset, the identity of the maintenance event, or suggested protocols for addressing the maintenance event.

As illustrated at 1004, a technician can follow the visual indicators to the rack location. For example, the rack in which the select asset is located can provide a visual indication through an associated location indicator device. Optionally, location indicator devices on racks or at row ends on a path to the desired rack can provide a visual indication of the location of the rack in which the select asset is located.

Once a technician has reached the rack, the technician can confirm that they are located at or positioned at the correct rack location, as illustrated at 1006. For example, the screen display device associated with the rack can display a scan code. The technician can scan the scan code using the handheld device. In another example, the asset tracking system can further monitor the handheld device using methods similar to the asset tracking methods to determine the approximate location of the handheld device associated with the technician or the location of an asset location device associated with the technician. As illustrated at 1008, the handheld device, either in response to scanning the asset location device, scanning the scan code, or receiving an indication from the asset tracking system, can confirm that it is positioned at the correct rack and for example, by scanning a scan code on the asset location device, can determine that the select asset is located within the rack. The technician can then perform maintenance on the asset, as illustrated at 1010.

In a particular example, the above described beacon or advertising signals complies with the Bluetooth Low Energy (LE) protocols of Bluetooth 4.0 or 5.0. In alternative examples, the beacon or advertising signals can comply with standards for advertising wireless networks, for example, under IEEE 802.11x.

In a first aspect, a system includes an asset management system in communication with an asset disposed within a rack; an asset tracking server in communication with the asset management system; a gateway in communication with the asset tracking server; and a set of equipment racks including the rack in which the asset is disposed. Each equipment rack of the set of equipment racks defines a face and has a plurality of equipment slots distributed along the faces. The each equipment rack includes an observer device and a location indicator device in communication with the observer device. The location indicator device is disposed proximal to the front face and on the rack. The asset management system is to identify a maintenance event associated with the asset and is to communicate the identity of the asset to the asset tracking server. The asset tracking server is to locate the rack location of the asset and is to communicate with the observer device associated with the rack location. The observer device is to direct the location indicator device to provide a light signal.

In an example of the first aspect, the system further includes a set of asset location devices attached to assets disposed within the set of equipment racks, an asset location device of the set of asset location devices attached to the asset, wherein the asset tracking server is to locate the rack location of the asset location device associated with the asset to locate the rack location of the asset.

In another example of the first aspect and the above examples, the system further includes a row-end location indicator device, the asset tracking server to identify a row in which the rack is disposed and to identify a row-end observer device associated with a row-end rack disposed at the end of the row, the asset tracking server to direct the row-end observer device to direct the row-end location indicator device to provide a second light signal. For example, the light signal has a color different than the second light signal. In another example, the light signal has a different light pattern than the second light signal.

In a further example of the first aspect and the above examples, the asset tracking server is to identify racks along a path to the rack in which the asset is disposed, the asset tracking server to direct observer devices associated with the identified racks to direct location indicator devices on the racks to provide a third light signal. For example, the third light signal is indicative of a direction to the rack in which the asset is disposed. In another example, the third light signal includes activating light sources of the location indicator devices sequentially. In a further example, the third light signal includes activating light sources of the location indicator device to simulate motion in the direction of the rack in which the asset is located. In an additional example, the third light signal has a color different than the light signal.

In an additional example of the first aspect and the above examples, the asset management device further is to communicate maintenance information associated with the maintenance event to the asset tracking server.

In another example of the first aspect and the above examples, the system further includes a handheld device. For example, the asset tracking server is to communicate the rack location to the handheld device. In an example, the asset management system is to communicate maintenance information associated with the maintenance event to the handheld device. For example, the asset management system is to communicate the maintenance information to the handheld device via the asset tracking server and gateway.

In a further example of the first aspect and the above examples, the system further includes a display device associated with the observer device. For example, the observer device is to direct the display device to display a scan code. In an example, the scan code is indicative of the asset identification. In another example, the scan code is indicative of the maintenance event.

In an additional example of the first aspect and the above examples, the observer device communicates with the gateway at frequencies having a range of 100 MHz to 1 GHz.

In another example of the first aspect and the above examples, the system further includes an infrared beacon to transmit an infrared beacon identifier in an infrared signal, the asset location device to receive the infrared signal and to communicate the IR beacon identifier to the asset tracking server.

In a second aspect, a method for indicating a rack location includes determining a maintenance event associated with a rack-based asset using an asset management system; communicating an identification of the asset from the asset management system to an asset tracking server; identifying a rack location of the asset with the asset tracking server based on the identification of the asset; and directing a rack-based observer device associated with the rack location to initiate a light signal using a location indicator device.

In an example of the second aspect, the method further includes identifying a row-end rack location using the asset tracking server. For example, the method further includes directing a second rack-based observer device associated with the row-end rack location to initiate a second light signal using a row-end location indicator device. In an example, the light signal has a color different than the second light signal. For example, the light signal has a different light pattern than the second light signal.

In another example of the second aspect, the method further includes determining a set of rack locations in a path toward the rack location associated with the asset; and directing a set of observer devices associated with the rack locations in the path to direct location indicator devices to provide a third light signal. For example, the third light signal is indicative of a direction to the rack in which the asset is disposed. In an example, the third light signal includes activating light sources of the location indicator devices consecutively. In a further example, the third light signal includes activating light sources of the location indicator device to simulate motion in the direction of the rack in which the asset is located. In another example, the third light signal has a color different than the light signal.

In a further example of the second aspect, the method further includes communicating maintenance information associated with the maintenance event to the asset tracking system from the asset management system.

In an additional example of the second aspect, the method further includes communicating the rack location to a handheld device. For example, the method includes detecting proximity of the handheld device and changing the light signal in response to the proximity of the handheld device to the rack location. In another example, the method includes communicating maintenance information to the handheld device.

In another example of the second aspect, a display device is associated with the observer device, further comprising displaying a scan code on the display device and scanning the scan code with the handheld device. For example, the method further includes providing asset information to the handheld device in response to scanning the scan code. In another example, the method further includes providing maintenance information associated with the maintenance event to the handheld device in response to scanning the scan code. In an additional example, the method includes tracking maintenance performance in response to scanning the scan code.

In a further example of the second aspect, the method further includes receiving an infrared beacon signal at the asset location device, the infrared beacon signal including an infrared identifier and communicating the infrared identifier to the asset tracking server.

Embodiments of the above-described system provide technical advantages over conventional tracking systems. For example, asset location device locations can be identified with greater accuracy and efficacy. The system allows for faster maintenance of devices and fewer errors associated physically locating an asset.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive- or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method for indicating a rack location, the method comprising:
    determining a directive associated with a rack-based asset using an asset management system;
    communicating an identification of the asset from the asset management system to an asset tracking server;
    identifying a rack location of the asset with the asset tracking server based on the identification of the asset; and
    directing a rack-based observer device associated with the rack location to initiate a light signal using an associated rack-based location indicator device in direct communication with the rack-based observer device, in response to signals received from the asset tracking server.

2. The method of claim 1, further comprising identifying a row-end rack location using the asset tracking server.

3. The method of claim 2, further comprising directing a second rack-based observer device associated with the row-end rack location to initiate a second light signal using a row-end location indicator device.

4. The method of claim 3, wherein the light signal has a color different than the second light signal.

5. The method of claim 3, wherein the light signal has a different light pattern than the second light signal.

6. The method of claim 1, further comprising communicating maintenance information associated with the directive to the asset tracking system from the asset management system.

7. The method of claim 1, further comprising communicating the rack location to a handheld device.

8. The method of claim 1, further comprising receiving an infrared beacon signal at the asset location device, the infrared beacon signal including an infrared identifier and communicating the infrared identifier to the asset tracking server.

9. The method of claim 1, wherein the directive comprises a maintenance event associated with the rack-based asset.

10. A method for indicating a rack location, the method comprising:
    determining a directive associated with a rack-based asset using an asset management system;
    communicating an identification of the asset from the asset management system to an asset tracking server;
    identifying a rack location of the asset with the asset tracking server based on the identification of the asset;
    directing a rack-based observer device associated with the rack location to initiate a light signal using an associated location indicator device in response to signals received from the asset tracking server;
    determining a set of rack locations in a path toward the rack location associated with the asset; and
    directing a set of observer devices associated with the rack locations in the path to direct location indicator devices to provide a third light signal.

11. The method of claim 10, wherein the third light signal is indicative of a direction to the rack in which the asset is disposed.

12. The method of claim 10, wherein the third light signal includes activating light sources of the location indicator devices sequentially.

13. The method of claim 10, wherein the third light signal includes activating light sources of the location indicator device to simulate motion in the direction of the rack in which the asset is located.

14. The method of claim 10, wherein the third light signal has a color different than the light signal.

15. A method for indicating a rack location, the method comprising:

determining a directive associated with a rack-based asset using an asset management system;

communicating an identification of the asset from the asset management system to an asset tracking server;

identifying a rack location of the asset with the asset tracking server based on the identification of the asset;

directing a rack-based observer device associated with the rack location to initiate a light signal using an associated location indicator device in response to signals received from the asset tracking server;

communicating the rack location to a handheld device; and detecting proximity of the handheld device and changing the light signal in response to the proximity of the handheld device to the rack location.

16. The method of claim 15, further comprising communicating maintenance information to the handheld device.

17. The method of claim 15, wherein a display device is associated with the observer device, further comprising displaying a scan code on the display device and scanning the scan code with the handheld device.

18. The method of claim 17, further comprising providing asset information to the handheld device in response to scanning the scan code.

19. The method of claim 17, further comprising providing maintenance information associated with the directive to the handheld device in response to scanning the scan code.

20. The method of claim 17, further comprising tracking maintenance performance in response to scanning the scan code.

* * * * *